US012680920B2

(12) United States Patent
Seo

(10) Patent No.: US 12,680,920 B2
(45) Date of Patent: Jul. 14, 2026

(54) MEASUREMENT SYSTEM FOR PROCESS MONITORING

(71) Applicant: Hongik University Industry-Academia Cooperation Foundation, Seoul (KR)

(72) Inventor: Jung Hwan Seo, Seoul (KR)

(73) Assignee: Hongik University Industry-Academia Cooperation Foundation, Seoul (KR)

(*) Notice: Subject to any disclaimer, the term of this patent is extended or adjusted under 35 U.S.C. 154(b) by 607 days.

(21) Appl. No.: 18/037,205

(22) PCT Filed: Nov. 5, 2021

(86) PCT No.: PCT/KR2021/016020
§ 371 (c)(1),
(2) Date: May 16, 2023

(87) PCT Pub. No.: WO2022/103085
PCT Pub. Date: May 19, 2022

(65) Prior Publication Data
US 2024/0019343 A1    Jan. 18, 2024

(30) Foreign Application Priority Data

Nov. 16, 2020    (KR) ........................ 10-2020-0152846
Nov. 1, 2021    (KR) ........................ 10-2021-0147802

(51) Int. Cl.
*G01N 1/24*    (2006.01)
*G01N 21/33*    (2006.01)

(52) U.S. Cl.
CPC ............... *G01N 1/24* (2013.01); *G01N 21/33* (2013.01); *G01N 2001/245* (2013.01)

(58) Field of Classification Search
CPC .. G01N 1/2205; G01N 1/24; G01N 2001/028; G01N 2001/245; G01N 21/33; (Continued)

(56) References Cited

U.S. PATENT DOCUMENTS

| | | | |
|---|---|---|---|
| 5,715,052 A | 2/1998 | Fujino et al. | |
| 6,119,532 A | 9/2000 | Park et al. | |

(Continued)

FOREIGN PATENT DOCUMENTS

| | | |
|---|---|---|
| JP | 2004-340685 | 12/2004 |
| KR | 10-2017-0040690 | 4/2017 |
| KR | 10-1735300 | 5/2017 |

OTHER PUBLICATIONS

Office Action in Korean Appln. No. 10-2021-0147802, dated Jul. 31, 2023, 29 pages (with English translation).

(Continued)

*Primary Examiner* — Jennifer Wecker
*Assistant Examiner* — Jonathan Bortoli
(74) *Attorney, Agent, or Firm* — Fish & Richardson P.C.

(57) ABSTRACT

A measurement system for measuring a status of a process of a treatment apparatus for treating a component in a chamber to generate a gas mixture including gaseous phase materials includes a sampling unit configured to selectively communicate an exhaust pipe for discharging the gas mixture including the gaseous phase materials from the chamber to sample the gas mixture from the exhaust pipe as much as a predetermined time or a predetermined volume; and a detection unit configured to separate and detect the gaseous phase materials included in the gas mixture sampled by the sampling unit into substances.

22 Claims, 12 Drawing Sheets

(58) Field of Classification Search
CPC .. G01N 33/00; G01N 33/0095; G01N 1/2247;
G01N 2001/2244; G01N 2021/3166;
G01N 2021/317
See application file for complete search history.

(56) References Cited

U.S. PATENT DOCUMENTS

| | | |
|---|---|---|
| 2006/0043279 A1 | 3/2006 | Kudryavtsev et al. |
| 2008/0105036 A1 | 5/2008 | Kendler et al. |
| 2011/0132196 A1* | 6/2011 | Suzuki .............. G01N 30/6095 |
| | | 156/77 |
| 2013/0186174 A1* | 7/2013 | Seo ........................ G01N 30/00 |
| | | 73/23.35 |
| 2017/0299556 A1 | 10/2017 | Sasaki et al. |
| 2018/0299414 A1 | 10/2018 | Jung et al. |

OTHER PUBLICATIONS

International Search Report and Written Opinion in International
Appln. No. PCT/KR2021/016020, mailed on Feb. 17, 2022, 16
pages.

\* cited by examiner

MEASUREMENT SYSTEM FOR PROCESS MONITORING

CROSS-REFERENCE TO RELATED APPLICATIONS

This application is a National Stage application under 35 U.S.C. § 371 of International Application No. PCT/KR2021/016020, having an International Filing Date of Nov. 5, 2021, which claims priority to South Korean Application Serial No. 10-2021-0147802, filed on Nov. 1, 2021, and South Korean Application Serial No. 10-2020-0152846, filed on Nov. 16, 2020. The disclosure of the prior applications is considered part of the disclosure of this application, and is incorporated in its entirety into this application.

TECHNICAL FIELD

The present disclosure relates to a measurement system, and more particularly, to a measurement system for monitoring how much of a process for a component (especially, a semiconductor component) being treated in a chamber is completed.

BACKGROUND ART

In a semiconductor fabrication process, surface treatment of semiconductor components such as wafers, for example, cleaning, etching or the like, occupies a very important position in ensuring the yield and accuracy of products. In general, the cleaning and etching processes of the semiconductor components are performed using plasma and UV ozone.

To identify the state of the wafer to determine whether the process was properly completed, after the process is completed, the substances on the wafer surface are analyzed by a wafer surface substance analyzer of high price (a few hundreds of millions to a few billions) using Time of Flight (ToF)-Secondary Ion Mass Spectroscopy (SIMS).

The TOF-SIMS method is used to identify the chemical composition and surface structure by analyzing cations or anions emitted while primary ions strike a surface, and has a wide detection area and high precision, but an instrument for using the corresponding method is expensive and cannot be reduced in size, thereby failing to detect in situ. Additionally, to use the TOF-SIMS method, after the process of the semiconductor component is completed, it is necessary to test the semiconductor component, and thus real-time monitoring is impossible.

Accordingly, in practice, it is impossible to monitor the current status of the process in real time during the process and control the process in a personalized optimal manner.

A Residual Gas Analyzer (RGA) is used to monitor the status of the semiconductor process in real time during the process. However, RGA is also very expensive, fails to analyze gas mixtures, and only works in a high vacuum chamber. The RGA has a limited use in deposition applications.

Due to the technical and economic reasons, in the main process of semiconductor treatment such as etching or cleaning, during the process, there is no apparatus for real-time (in-situ) measurement to identify the presence or absence of the remaining materials on the surface of the semiconductor component, and the controlled state and leakage of gaseous phase materials used in the corresponding process.

As a consequence, it results in lower fabrication accuracy and yield of the semiconductor component and higher manufacturing cost, and accordingly its solution is emergently needed.

DISCLOSURE

Technical Problem

The present disclosure is directed to providing a measurement system for monitoring the current status of a process in real time (in situ) using an existing semiconductor treatment apparatus such as plasma cleaning equipment or etching equipment.

Technical Solution

A measurement system for measuring a status of a process of a treatment apparatus for treating a component in a chamber to generate a gas mixture including gaseous phase materials according to an embodiment of the present disclosure includes a sampling unit configured to selectively communicate an exhaust pipe for discharging the gas mixture including the gaseous phase materials from the chamber to sample the gas mixture from the exhaust pipe as much as a predetermined time or a predetermined volume; and a detection unit configured to separate and detect the gaseous phase materials included in the gas mixture sampled by the sampling unit into substances.

According to an embodiment, the exhaust pipe is connected to a bypass pipe which branches off from the exhaust pipe and connects to the exhaust pipe again, and the sampling unit selectively communicates the bypass pipe and selectively communicates the exhaust pipe.

According to an embodiment, the bypass pipe includes an upstream bypass pipe and a downstream bypass pipe connected through a multi-port valve, and the multi-port valve is configured to perform a sampling connection operation to shut off the direct communication between the upstream bypass pipe and the downstream bypass pipe, and to communicate the upstream bypass pipe with an inlet of the sampling unit and the downstream bypass pipe with an outlet of the sampling unit, and perform a sampling shutoff operation to directly communicate the upstream bypass pipe with the downstream bypass pipe, and discommunicate the bypass pipe from the sampling unit.

According to an embodiment, the multi-port valve is configured to perform a gas transfer operation to communicate the outlet of the sampling unit with the detection unit after the sampling shutoff operation or at a same time with the sampling shutoff operation.

According to an embodiment, during the gas transfer operation, the multi-port valve is configured to communicate the sampling unit with a carrier gas tank, and allow the gas mixture to flow to the detection unit by a carrier gas from the carrier gas tank.

According to an embodiment, the multi-port valve is configured to communicate the carrier gas tank with the detection unit, apart from the gas transfer operation.

According to an embodiment, a portion of a front end of the upstream bypass pipe is inserted into the exhaust pipe to guide some of the gas mixture flowing in the exhaust pipe into the upstream bypass pipe.

According to an embodiment, the exhaust pipe includes an upstream exhaust pipe and a downstream exhaust pipe connected through a multi-port valve, and the multi-port valve is configured to perform a sampling connection operation to shut off the direct communication between the upstream exhaust pipe and the downstream exhaust pipe, and to communicate the upstream exhaust pipe with an inlet of the sampling unit and the downstream exhaust pipe with an outlet of the sampling unit, and perform a sampling shutoff operation to directly communicate the upstream exhaust pipe with the downstream exhaust pipe, and dis-communicate the exhaust pipe from the sampling unit.

According to an embodiment, the sampling unit includes a sampler module to store the gas mixture as much as the predetermined volume.

According to an embodiment, the detection unit includes a separation module to separate the gaseous phase materials included in the gas mixture into substances; and a sensor module to detect the gaseous phase materials from the separation module.

According to an embodiment, the separation module includes a separation path in which the gaseous phase materials move at different movement speeds according to substances, to separate the gaseous phase materials into substances and discharge at time intervals, and the sensor module is configured to measure a time and concentration at which the gaseous phase materials from the separation path are detected.

According to an embodiment, the separation path has a shape of a column bent in a maze pattern within a set space.

According to an embodiment, a porous material is coated on an inner surface of the separation path, and the gaseous phase materials repeatedly attach to and separate from the porous material while flowing along the separation path.

According to an embodiment, the sensor module is configured to detect a concentration of the gaseous phase materials by measuring a voltage change by electrons released from the corresponding gaseous phase materials by applying UV to the gaseous phase materials from the separation module.

According to an embodiment, the measurement system includes a concentration module to extract the gaseous phase materials included in the gas mixture sampled by the sampling unit and concentrate and store the gaseous phase materials.

According to an embodiment, the concentration module is disposed in one of the sampling unit and the detection unit.

According to an embodiment, the concentration module includes a concentration chamber; and an adsorbent to trap the gaseous phase materials filled in the concentration chamber.

According to an embodiment, the concentration chamber has a plurality of pillars to support the adsorbent.

According to an embodiment, the concentration module, the separation module and the sensor module are incorporated into a single portable device.

According to an embodiment, the exhaust pipe is connected to a pump to form a pressure for discharging the gas mixture from the chamber, and an inlet and an outlet of the sampling unit selectively communicate the exhaust pipe between the chamber and the pump.

According to an embodiment, the exhaust pipe is connected to a pump to form a pressure for discharging the gas mixture from the chamber, and the bypass pipe has an entry and an exit connected to the exhaust pipe between the chamber and the pump.

According to an embodiment, the component is a semiconductor component, and the treatment apparatus is a semiconductor treatment apparatus for etching or cleaning the semiconductor component.

BEST MODE

Figure 1:
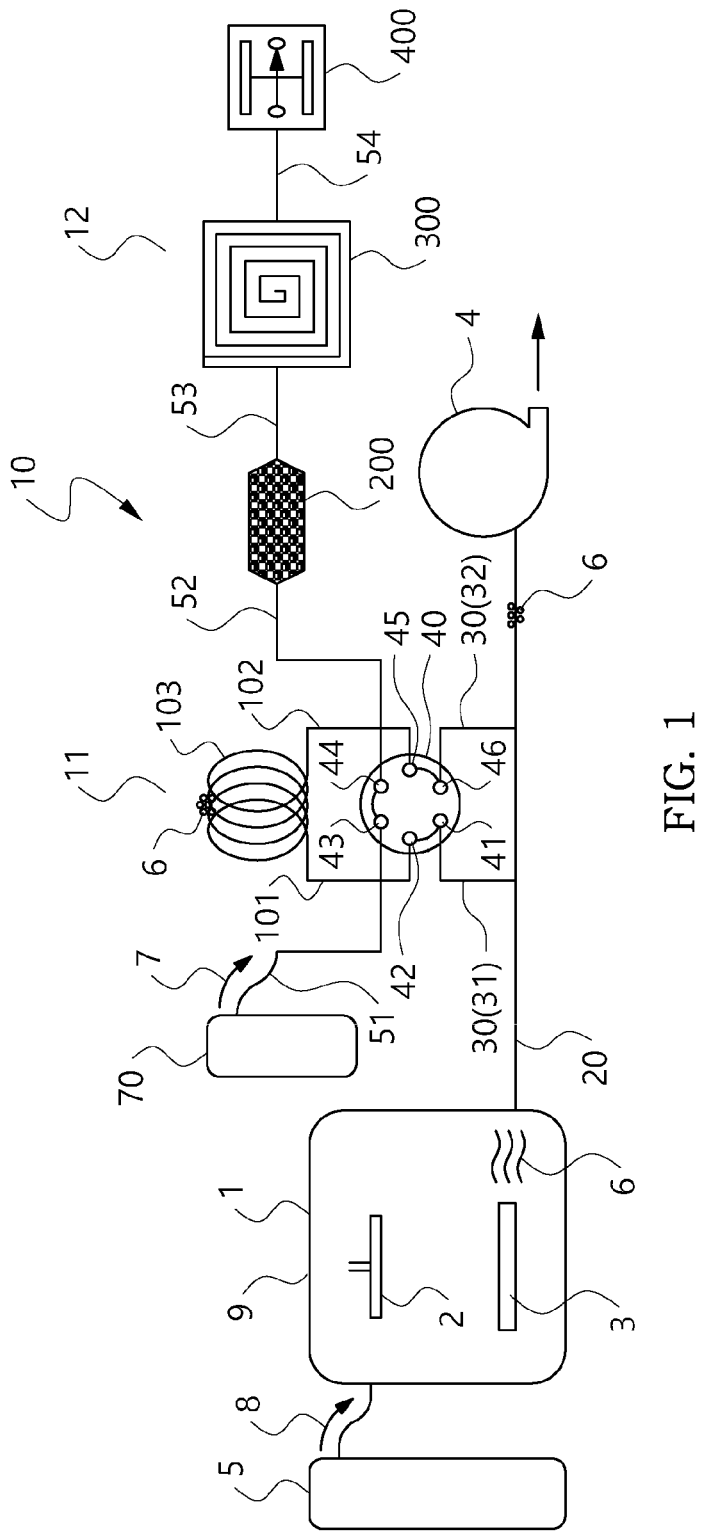
FIGS. 1 to 4 are schematic system diagrams of a measurement system according to an embodiment of the present disclosure, illustrating the operation of the measurement system in a sequential order.

Hereinafter, exemplary embodiments of the present disclosure will be described with reference to the accompanying drawings. The present disclosure is described with reference to the embodiments shown in the drawings, but the description is provided as an embodiment and the technical spirit of the present disclosure and its essential components and operation are not limited thereto.

"Upstream" as used herein refers to a side from which a fluid flows, and "downstream" refers to an opposite side to the upstream.

Embodiment

FIGS. 1 to 4 are schematic system diagrams of a measurement system 10 according to an embodiment of the present disclosure, illustrating the operation of the measurement system 10 in a sequential order.

The measurement system 10 according to this embodiment is a measurement system for detecting the status of a process for a component in a treatment apparatus for treating the component in a chamber to generate a gas mixture 6 including gaseous phase materials 60.

<Treatment Apparatus 1>

The treatment apparatus 1 according to this embodiment is a semiconductor treatment apparatus that performs a plasma cleaning process to clean a wafer 3 which is the semiconductor component through a plasma generator (electrode) 2 in the chamber 9 in a vacuum state.

When the plasma cleaning process starts, a cleaning gas 8 (for example, $O_2$) is fed into the chamber 9 in the vacuum state from an external cleaning gas tank 5.

The cleaning gas 8 ionized by the plasma generated by the plasma generator 2 reacts with compounds of the surface of the wafer 3 to produce the gaseous phase materials 60 which are organic compounds of different substances.

The gas mixture 6 including the gaseous phase materials 60 comes out through an exhaust pipe 20 in communication with the chamber 9. A pump 4 is connected to the downstream side of the exhaust pipe 20 to form the vacuum in the chamber 9 and provide the pressure for discharging the gas mixture 6.

The configuration of the semiconductor treatment apparatus for performing the plasma cleaning process is known, and its detailed description is omitted.

<Measurement System 10>

The measurement system 10 according to this embodiment is configured to detect the gaseous phase materials 60 included in the gas mixture 6 substantially in real time by analyzing the gas mixture 6 discharged from the treatment apparatus 1.

Referring to FIG. 1, the measurement system 10 includes a sampling unit 11 to selectively communicate the exhaust pipe 20 of the treatment apparatus 1 to sample the gas mixture 6 from the exhaust pipe 20 as much as a predetermined time or a predetermined volume, and a detection unit 12 to separate and detect the gaseous phase materials 60 included in the gas mixture 6 sampled by the sampling unit 11.

The sampling unit 11 according to this embodiment includes an inlet 101 through which the gas mixture 6 enters, an outlet 102 through which the gas mixture 6 exits, and a sampler module 103 between the inlet 101 and the outlet 102.

The inlet 101 and the outlet 102 have a long conduit shape, and the sampler module 103 has a spirally coiled shape of a conduit shape.

Here, the sampler module 103 may have any other shape, and for convenience of description, the inlet 101 and the outlet 102 are different from each other, but the sampling unit 11 according to this embodiment is formed by spirally winding the intermediate portion of a single conduit.

Since the sampler module 103 is formed in a spiral shape, it is possible to increase the volume of the gas mixture 6 sampled by the sampling unit 11.

The sampling unit 11 according to this embodiment has the conduit shape with two open ends, and the gas mixture 6 continuously flows in the conduit while the sampling unit 11 is in communication with the exhaust pipe 20. That is, the gas mixture 6 of the same volume is always filled in the sampling unit 11.

Accordingly, when the sampling unit 11 and the exhaust pipe 20 are in non-communication with each other, the gas mixture 6 of the same volume is always sampled in the sampling unit 11 at any time.

The detection unit 12 according to this embodiment includes a concentration module 200 to extract the gaseous phase materials 60 included in the gas mixture 6 sampled by the sampling unit 11 and concentrate and store the gaseous phase materials 60, a separation module 300 to separate the gaseous phase materials 60 concentrated in the concentration module 20 into substances, and a sensor module 400 to detect the gaseous phase materials 60 from the separation module 300. Each module of the detection unit 12 will be described in more detail below.

As shown in FIG. 1, according to this embodiment, the exhaust pipe 20 is connected to a bypass pipe 30 that branches off from the exhaust pipe 20 and connects to the exhaust pipe 20 again. According to this embodiment, the diameter of the bypass pipe 30 is substantially equal to the diameter of the sampling unit 11.

According to this embodiment, the sampling unit 11 selectively communicates the bypass pipe 30 and selectively communicates the exhaust pipe 20.

According to this embodiment, the bypass pipe 30 has the entry and exit connected to the exhaust pipe 20 between the chamber 9 and the pump 4. That is, the sampling unit 11 is in communication with the exhaust pipe 20 on the upstream side of the pump 4.

Accordingly, it is possible to prevent the contamination of the sampled gas mixture 6 by oil from the pump 4. Furthermore, it is possible to easily apply the measurement system 10 to the existing treatment apparatus 1 by replacing the exhaust pipe 20 between the chamber 9 and the pump 4, relatively easy to change the structure, to install the bypass pipe 30.

More specifically, the bypass pipe 30 includes an upstream bypass pipe 31 and a downstream bypass pipe 32, both connected to the exhaust pipe 20, and the upstream bypass pipe 31 and the downstream bypass pipe 32 are selectively connected through a multi-port valve (hereinafter, referred to as "valve") 40 between them.

Figure 5A:
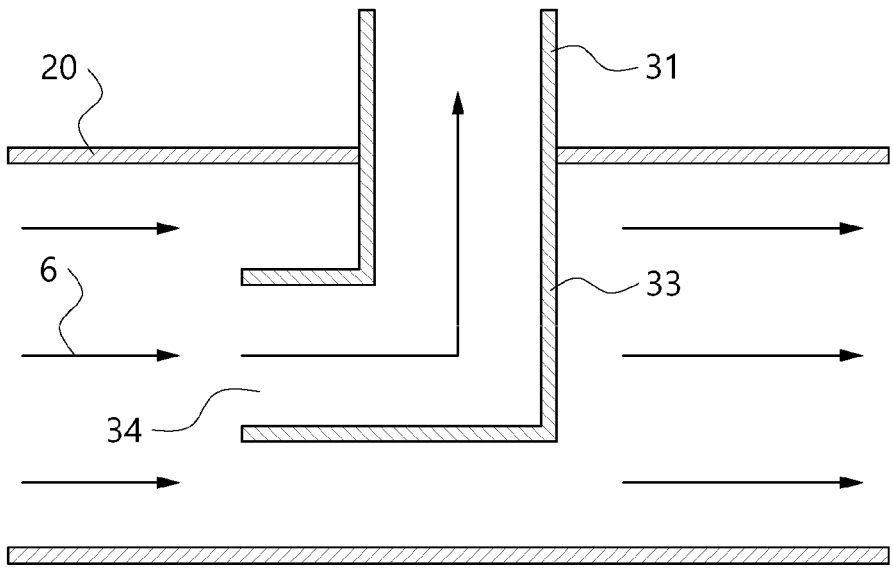
FIGS. 5A and 5B show examples of a connection shape of an upstream bypass pipe connected to an exhaust pipe in a measurement system according to an embodiment of the present disclosure.
Figure 5B:
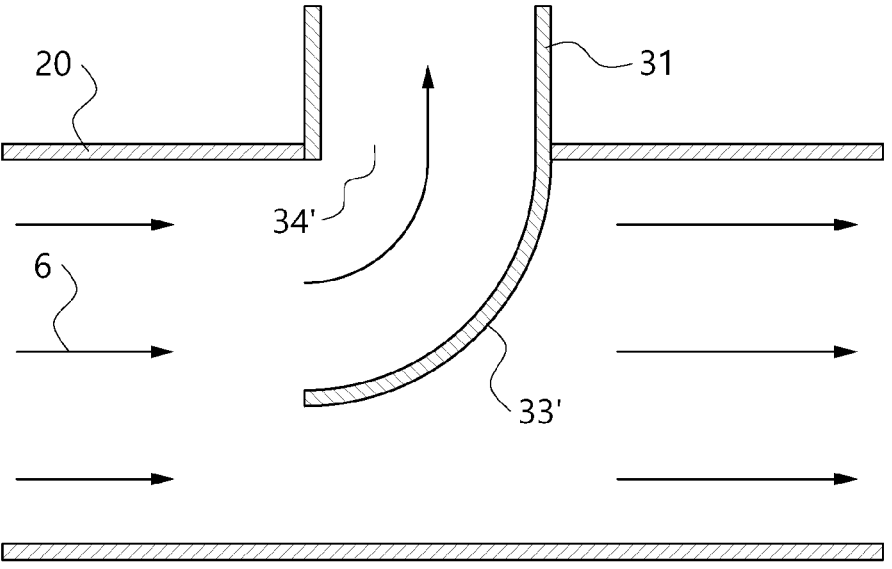

FIGS. 5A and 5B show examples of a connection shape of the upstream bypass pipe 31 connected to the exhaust pipe 20. In FIGS. 5A and 5B, the illustration of a coupler and a sealing member between the upstream bypass pipe 31 and the exhaust pipe 20 is omitted.

As shown in FIG. 5A, according to an embodiment, a portion 33 of a front end of the upstream bypass pipe 31 is inserted into the exhaust pipe 20. The portion 33 of the front end inserted into the exhaust pipe 20 has a cylindrical tubular shape in the same way as the other portion of the upstream bypass pipe 31, and the tip is bent toward the upstream side of the exhaust pipe 20. An inlet 34 is open at the tip of the upstream bypass pipe 31 facing the flow direction of the gas mixture 6. The inlet 34 may be disposed at the center of the upstream bypass pipe 31, and may be off center.

Since the inlet 34 faces the flow direction of the gas mixture 60, some of the gas mixture 6 are guided into the upstream bypass pipe 31 by the portion 33 of the front end inserted into the exhaust pipe 20. The gas mixture 6 flowing through the exhaust pipe 20 flows into the upstream bypass pipe 31 by the flow rate (see the arrow). Accordingly, in this embodiment, it is possible to prevent the failed entry of the gas mixture 6 into the upstream bypass pipe 31 by a pressure difference when the pressure of the chamber 9 is extremely low.

Alternatively, as shown in FIG. 5B, the portion 33' of the front end of the upstream bypass pipe 31 inserted into the exhaust pipe 20 may have a tongue shape that is smoothly bent toward the upstream side of the exhaust pipe 20.

Some of the gas mixture 6 flowing in the exhaust pipe 20 strike the tongue shaped portion 33' of the front end, and are naturally guided into the upstream bypass pipe 31 along the smooth curved surface. The gas mixture 6 enters the inlet 34' by the flow rate and flows into the upstream bypass pipe 31 (see the arrow). Accordingly, in this embodiment, it is possible to prevent the failed flow of the gas mixture 6 into the upstream bypass pipe 31 by a pressure difference when the pressure of the chamber 9 is extremely low.

According to this embodiment, the portion of the front end of the upstream bypass pipe 31 is inserted into the exhaust pipe 20, but in case where the pressure of the chamber 9 is sufficiently high, the front end of the upstream bypass pipe 31 may not be inserted into the exhaust pipe 20.

Referring back to FIG. 1, the valve 40 according to this embodiment is a six port valve having first to sixth ports 41 to 46.

The first port 41 of the valve 40 connects to the exit of the upstream bypass pipe 31, and the sixth port 46 connects to the entry of the downstream bypass pipe 32. The second port 42 of the valve 40 connects to the inlet 101 of the sampling unit 11, and the fifth port 45 connects to the outlet 102 of the sampling unit 11.

The third port 43 of the valve 40 connects to a conduit 51 connected to a carrier gas tank 7, and the fourth port 44 of the valve 40 connects to a conduit 52 connected to the concentration module 200.

The concentration module 200, the separation module 300 and the sensor module 400 are in communication with one another by conduits 53, 54.

<Operation of the Measurement System 10>

Hereinafter, the operation of the measurement system 10 for measuring the gaseous phase materials 60 will be described with reference to FIGS. 1 to 4.

As shown in FIG. 1, when the plasma cleaning process stars by the treatment apparatus 1, the valve 40 performs a sampling connection operation to sample the gas mixture 6 by the sampling unit 11.

Specifically, during the sampling connection operation, a control unit (not shown) of the valve 40 communicates the first port 41 with the second port 42 and the fifth port 45 with the sixth port 46. In this instance, the first port 41 and the sixth port 46 are in non-communication with each other.

Accordingly, the direct communication between the upstream bypass pipe 31 and the downstream bypass pipe 32 is shut off, and the upstream bypass pipe 31 and the inlet 101 of the sampling unit 11 are in communication with each other, and the downstream bypass pipe 32 and the outlet 102 of the sampling unit 11 are in communication with each other.

During the sampling connection operation of the valve 40, some of the gas mixture 6 flowing in the exhaust pipe 20 flow in the sampling unit 11 through the upstream bypass pipe 31, and then flow in the exhaust pipe 20 through the downstream bypass pipe 32 again.

According to this embodiment, as shown in FIG. 1, during the sampling connection operation (except a gas transfer operation as described below), the third port 43 and the fourth port 44 are in communication with each other (i.e., the carrier gas tank 70 and the detection unit 12 are in communication with each other) to allow a carrier gas (for example, $N_2$ or $H_2$) 7 to flow from the carrier gas tank 70 to the detection unit 12. Accordingly, the detection unit 12 is not contaminated by outdoor air and maintains a clear environment by the carrier gas 7. The carrier gas, for example, helium, has very low reactivity with a porous polymer or an organic compound as described below.

Figure 2:
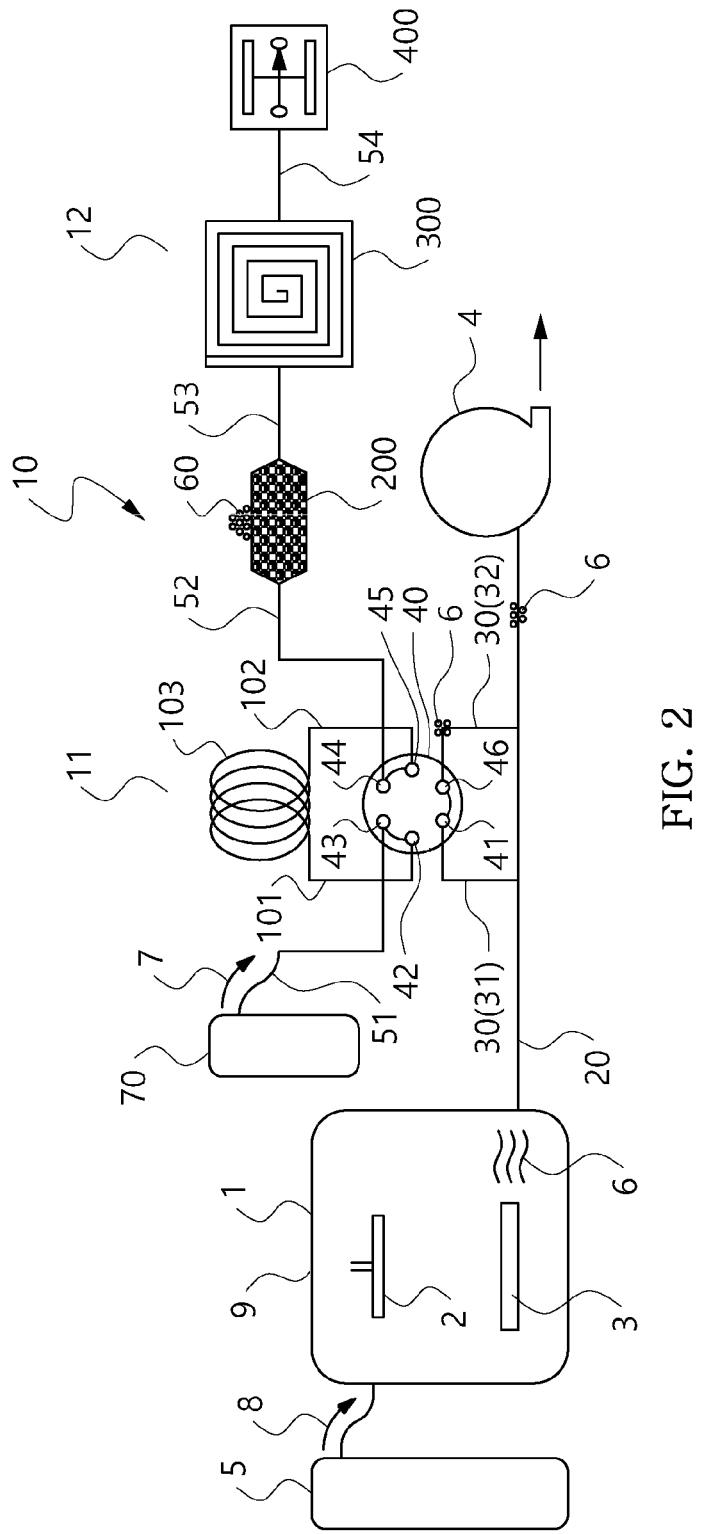

After the passage of a predetermined time, the control unit of the valve 40 enables the valve 40 to perform a sampling shutoff operation to shut off further sampling as shown in FIG. 2.

As shown in FIG. 2, during the sampling shutoff operation, the first port 41 and the second port 42 are in non-communication with each other, and the fifth port 45 and the sixth port 46 are in non-communication with each other. At the same time, the first port 41 and the sixth port 46 are in communication with each other.

Accordingly, the set volume of the gas mixture 6 by the sampling unit 11 is trapped in the sampling unit 11.

On the other hand, since the first port 41 and the sixth port 46 are in communication with each other, some of the gas mixture 6 flowing in the exhaust pipe 20 flows in the exhaust pipe 20 again through the upstream bypass pipe 31 and the downstream bypass pipe 32.

According to this embodiment, since the bypass pipe 31 and the conduit of the sampling unit 11 have substantially the same diameter, even when the sampling connection operation condition is instantaneously switched to the sampling shutoff operation condition, the amount of the gas mixture 6 diverted from the exhaust pipe 20 to the upstream bypass pipe 31 does not almost change.

When the bypass path is suddenly blocked while the constant amount of the gas mixture 6 is bypassed and diverted from the exhaust pipe 20, shocks by the pressure may occur in the exhaust pipe 20. The pump 4 or the treatment apparatus 1 may be adversely affected by the pressure shocks.

According to this embodiment, even when the sampling connection operation condition is instantaneously changed to the sampling shutoff operation condition, the constant amount of the gas mixture 6 is still bypassed from the exhaust pipe 20, thereby preventing abrupt pressure changes.

Furthermore, there is no need to stop the operation of the treatment apparatus 1 in the entire process of sampling the gas mixture 6, thereby increasing the yield of the semiconductor component.

Meanwhile, referring to FIG. 2, the control unit of the valve 40 according to this embodiment performs the gas transfer operation to discommunicate the third port 43 from the fourth port 44 and communicate the fourth port 44 with the fifth port 45 after the sampling shutoff operation or at the same time with the sampling shutoff operation. That is, when the gas transfer operation is performed, the outlet 102 of the sampling unit 11 is in communication with the detection unit 12.

The gas mixture 6 sampled by the sampling unit 11 may flow to the detection unit 12 by the pump (not shown) installed on the downstream side of the detection unit 12, but according to this embodiment, during the gas transfer operation, the second port 42 and the third port 43 are in communication with each other. Accordingly, the inlet 101 of the sampling unit 11 is in communication with the carrier gas tank 70. As shown in FIG. 2, the sampled gas mixture 6 is pushed by the carrier gas 7 from the carrier gas tank 70 so that it flows to the detection unit 12.

As shown in FIG. 2, the gas mixture 6 flows to the concentration module 200, and the gaseous phase materials 60 included in the gas mixture 6 are extracted by the concentration module 200 and concentrated and stored in the concentration module 200.

Figure 3:
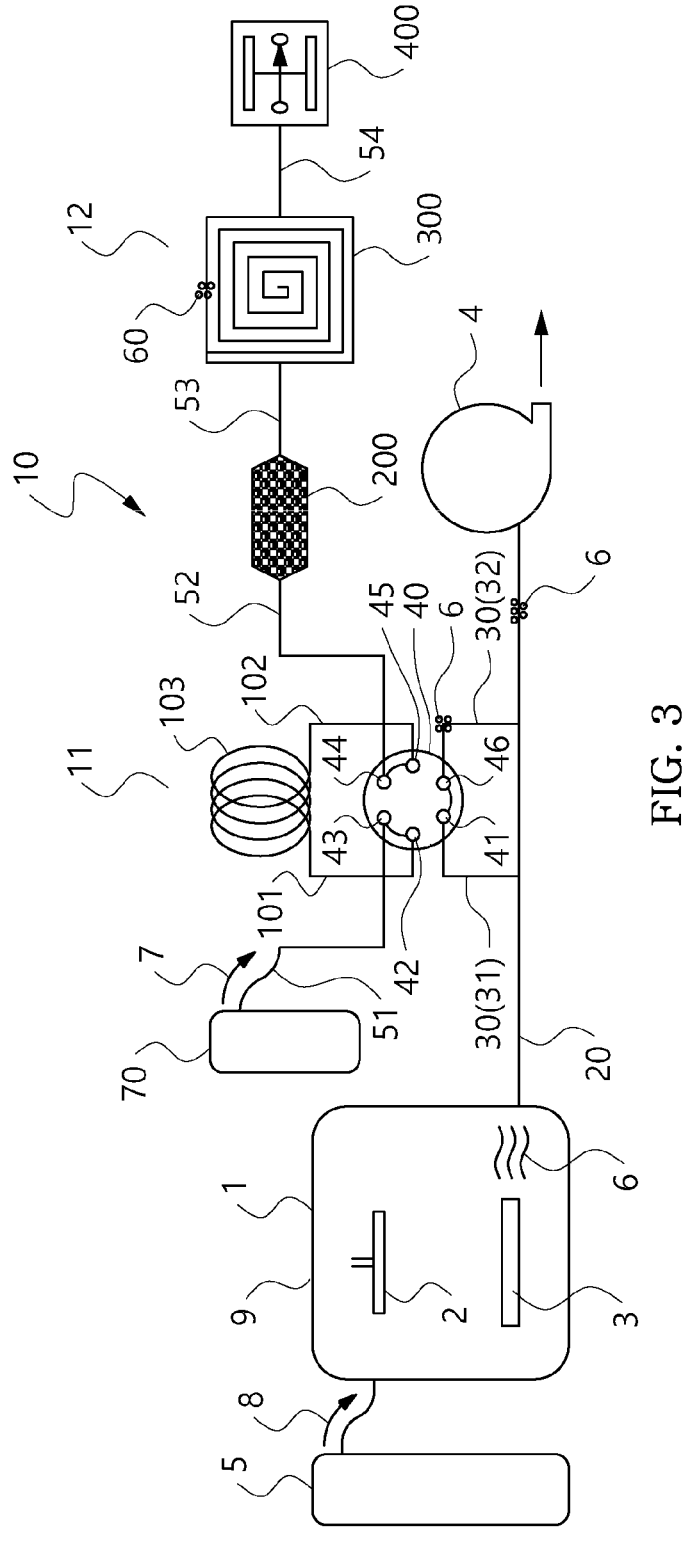

Subsequently, as shown in FIG. 3, when energy such as heat is applied to the concentration module 200, the gaseous phase materials 60 come out from the concentration module 200, and the carrier gas 7 carries the gaseous phase materials 60 to the separation module 300. The separation module 300 separates the gaseous phase materials 60 into substances and discharges them.

Figure 4:
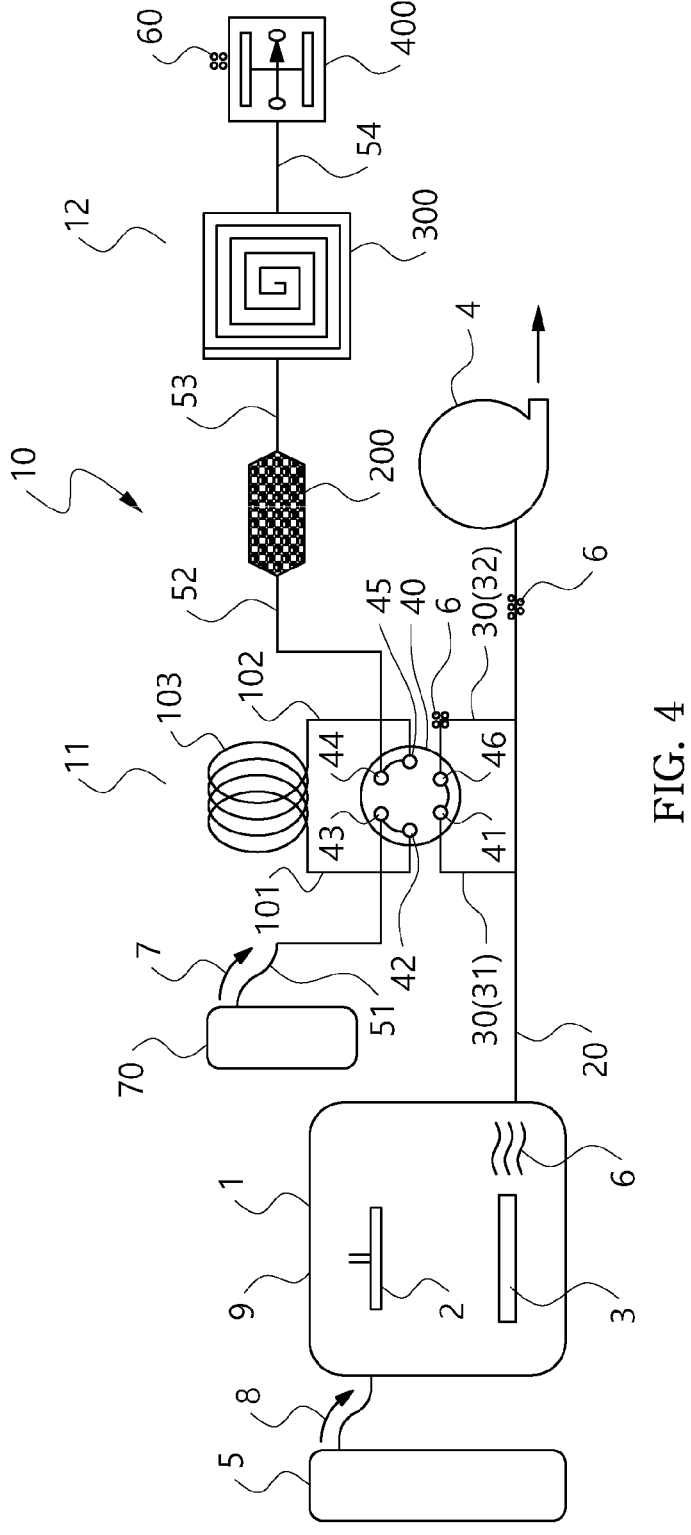

Subsequently, as shown in FIG. 4, the carrier gas 7 of constant velocity carries the gaseous phase materials 60 from the separation module 300 to the sensor module 400. The sensor module 400 detects the gaseous phase materials 60 upon arrival.

<Detection Unit 12>

Hereinafter, the configuration of the detection unit 12 and the principle of separation and detection of the gaseous phase materials 60 included in the gas mixture 6 by the detection unit 12 will be described with reference to FIGS. 6 to 11.

According to this embodiment, the concentration module 200, the separation module 300 and the sensor module 400 that constitute the detection unit 12 are reduced in size and integrated into a single portable detection device 120.

Figure 6:
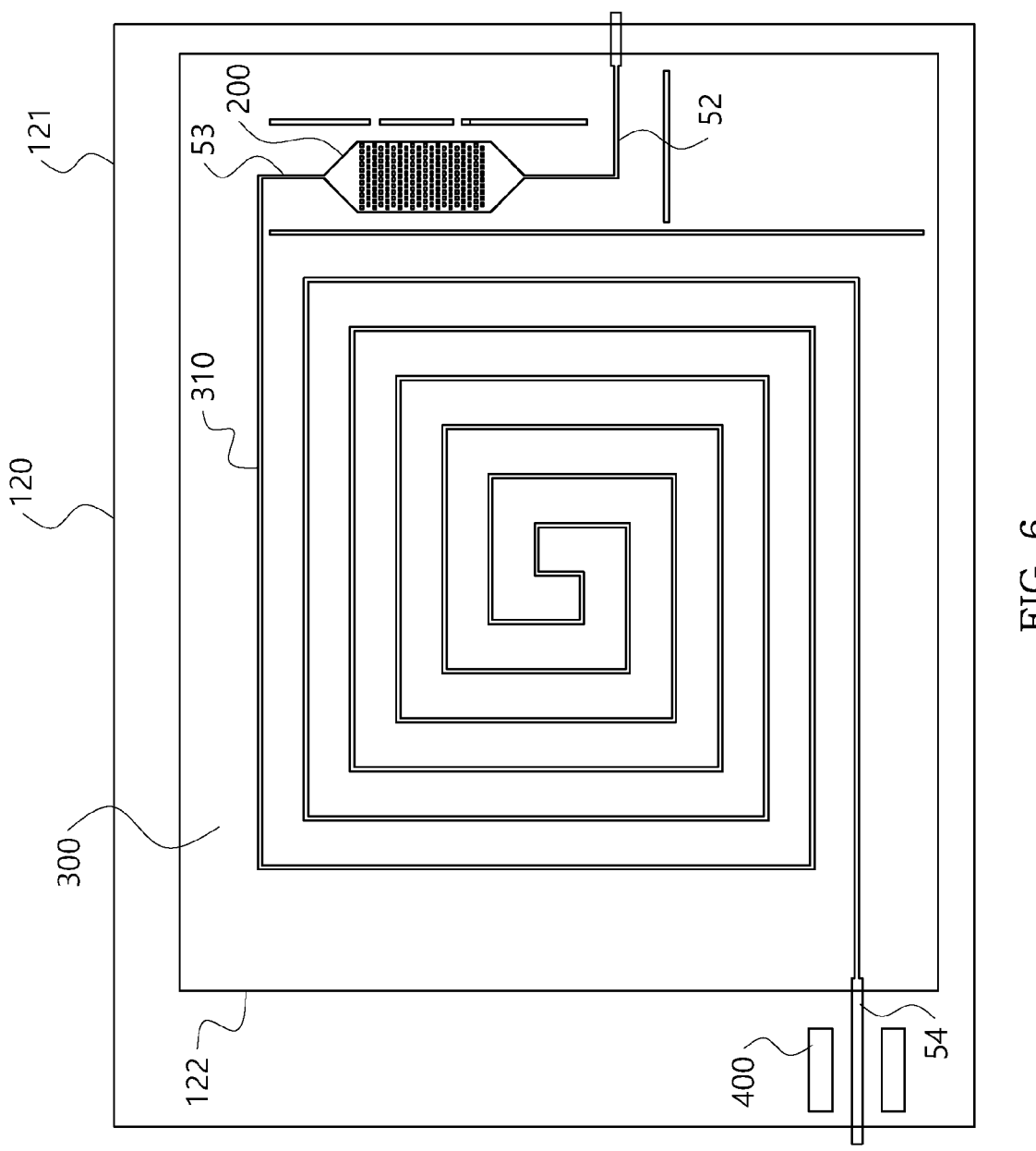
FIG. 6 is a schematic conceptual diagram of a detection device according to an embodiment of the present disclosure.

FIG. 6 is a schematic conceptual diagram of the detection device 120.

As shown in FIG. 6, the detection device 120 has a structure in which a substrate 122 on which the concentration module 200 and the separation module 300 are integrated and the sensor module 400 are installed in a single body 121. A heat line, a power source (not shown) of the sensor module 400 and a communication device (not shown) for transmission of a signal of the sensor module 400 are embedded in the body 121. Additionally, the body 121 may include a memory to store information such as libraries associated with the time taken by each gaseous phase material 60 to exit a separation path 310 as described below, and a processor to derive the results by comparing information detected by the sensor module with the libraries. Furthermore, the body 121 may include a speaker or a liquid crystal display to notify the derived results to a worker. However, the functions of the memory and the processor may be performed by another computer, and the detection device 120 may transmit the detection results by the sensor module to the computer via communication with another computer.

The substrate 122 is formed by bonding a plate (a first substrate) of silicone and a plate (a second substrate) of glass.

According to this embodiment, the concentration module 200, the separation module 200 and the plurality of pipelines 52, 53 connecting them are formed on one surface of the first substrate by deep etching using a deep reactive-ion etching (DRIE) process. Accordingly, it is possible to elaborately form a nano size structure on the substrate 122, thereby minimizing the total size of the detection device 120. The concentration module 200, the separation module 300 and the plurality of pipelines 52, 53 connecting them are simultaneously formed on the first substrate into a concave groove shape by etching, followed by placing and bonding the second substrate, thus completing a structure having the closed top with the concave groove closed.

According to this embodiment, the first substrate and the second substrate may be strongly bonded to each other in an atmospheric condition by anodic bonding that is a voltage assisted bonding process.

Figure 7:
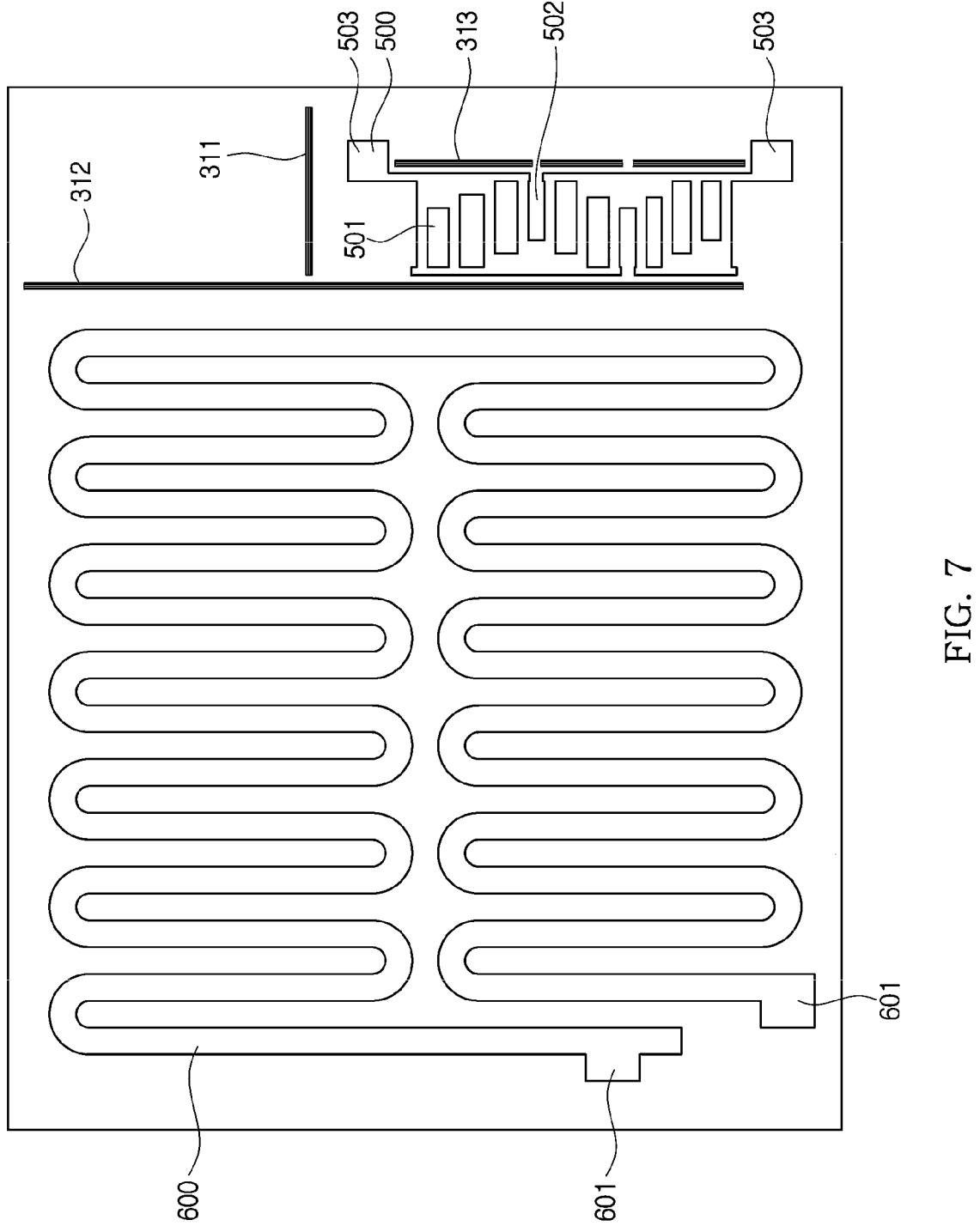
FIG. 7 is an enlarged diagram of a concentration module in the detection device of FIG. 6.

FIG. 7 is an enlarged diagram of the concentration module 200 according to this embodiment.

The concentration module 200 includes a concentration chamber 210 which is a space of larger volume than the pipeline connected to the concentration module 200.

The concentration chamber 210 includes two facing short sides extended in the short side direction of the concentration chamber 210, and two facing long sides extended in long side direction of the concentration chamber 210, and has an approximately long polygonal shape.

The short side is bent in an approximately "v" shape with the center facing away from the long side, thereby achieving uniform distribution of the fluid flowing in the concentration chamber 210.

The entry pipeline 52 in communication with the concentration chamber 210 to allow the gas mixture 6 to enter is formed at the center of one short side of the concentration chamber 210. The exit pipeline 53 through which gas exits the concentration chamber 210 is formed at the center of the other short side of the concentration chamber 210.

The "entry" and "exit" as used herein are intended to refer to different openings through which the fluid enters and exits the corresponding pipeline, and are not necessarily intended to define that the fluid enters at the entry and exits at the exit in the corresponding pipeline. That is, in some cases, the fluid may enter at the exit and exit at the entry in the corresponding pipeline.

A plurality of pillars 211 is arranged at a predetermined interval in the concentration chamber 210. When DRIE is used, the plurality of pillars 211 may be formed in the concentration chamber 210 by leaving parts of the concentration chamber 210 unetched when forming the concentration chamber 210.

The concentration chamber 210 extracts the gaseous phase materials 60 in the gas mixture 6, and concentrates and stores the gaseous phase materials 60. To this end, the concentration chamber 210 is filled with an adsorbent 212 to trap the gaseous phase materials 60. The adsorbent 212 may include, for example, materials such as carbon compounds, to which the gaseous phase materials 60 which are organic compounds attach by van der Waals forces, to trap the gaseous phase materials 60.

The adsorbent 212 may be pre-filled in the chamber 110 before bonding the first substrate and the second substrate, and the adsorbent 212 may be filled in the concentration chamber 210 by a gas transfer method. In the case of the gas transfer method, an inlet pipe (not shown) in communication with the concentration chamber 210 may be formed.

The gaseous phase materials 60 entering the concentration chamber 210 is trapped on the adsorbent 212 and concentrated and stored in the concentration chamber 210.

To discharge the gaseous phase materials 60 concentrated and stored in the concentration chamber 210, it is necessary to break the bonds between the adsorbent 212 and the gaseous phase materials 60, and the detection device 120 according to this embodiment includes a heating device to heat the concentration chamber 210.

Figure 8:
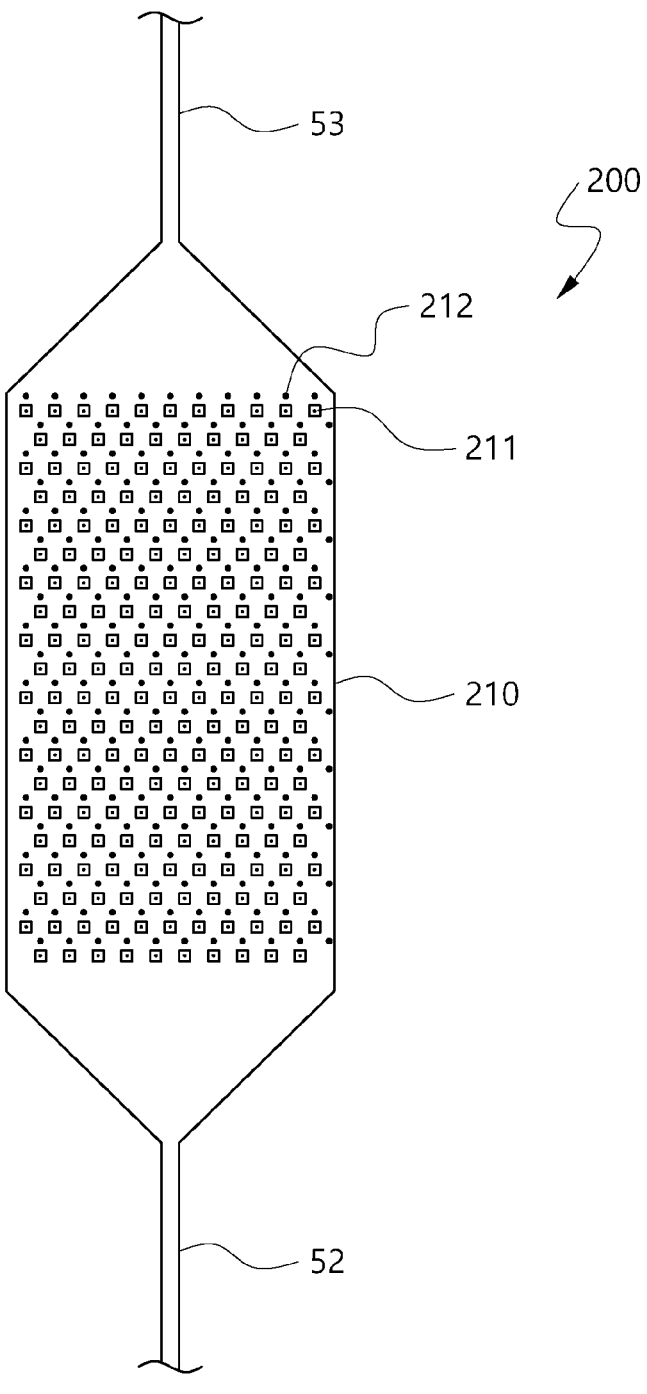
FIG. 8 is a rear view of a substrate connected to the detection device of FIG. 6.

FIG. 8 shows the rear surface of the first substrate.

The heat line 500 as the chamber heating device is attached to the rear surface of the first substrate to generate heat when the power is applied. The heat line 500 is formed in the first substrate at a location corresponding to the concentration chamber 210. The heat line 500 has a terminal 503 for connection to the power source. A temperature sensor 502 may be disposed at the center of the heat line 500 to measure the temperature that increases by the heat line 500.

When heat is generated by applying the power to the heat line 500, thermal energy that may debond the adsorbent 212 and the gaseous phase materials 60 may be selectively applied to the concentration chamber 210. Meanwhile, as shown in FIG. 8, according to this embodiment, a heat line 600 that selectively applies heat to the separation path 310 to improve the reactivity in the separation path 310 as described below may be formed in the rear surface of the first substrate at a location corresponding to the separation path 310. The heat line 600 has a terminal 601 for applying the power at two ends.

In this instance, the heat applied by the heat line 501 may be unexpectedly applied to the adjacent component such as the separation path 310 by thermal conduction by the first substrate of silicon.

To prevent the thermal conduction as much as possible, according to this embodiment, a plurality of slits 311, 312,

313 is formed around the heat line 501 and completely passes through the first substrate.

The pipeline 53 in communication with the concentration module 200 is in communication with the separation module 300.

The separation module 300 includes the elongated separation path 310. The separation path 310 forms a single fluid flow path, and the gaseous phase materials 60 entering the separation path 310 are separated into substances while moving along the separation path 310 having the very long path and discharged from the separation path 310 at time intervals.

According to this embodiment, for the separation path 310 to have a long path enough to separate hazardous materials, the separation path 310 is disposed to form a single layer of column bent in a maze pattern within a set rectangular or square space.

As shown in FIG. 6, the separation path 310 is bent from the entry of the separation path 310 in fluid communication with the conduit 53 to the center of the rectangular or square space, extended in the shape of a sort of coil, and then extended from the center to the exit of the separation path 310 in a coil shape. That is, the path in the column form extended in a serpentine shape toward the center and the path extended facing away from the center are arranged adjacent to each other in an alternating manner, thereby maximizing the path length of the separation path 310 within the small space.

Although FIG. 6 shows the adjacent paths spaced apart at sufficient intervals for convenience of illustration, the interval between the adjacent paths is very short.

Since the paths are arranged at very short intervals, the separation path 310 having a cross sectional area of a few nanometer level may be, for example, extended over about 3 m.

Figure 9:
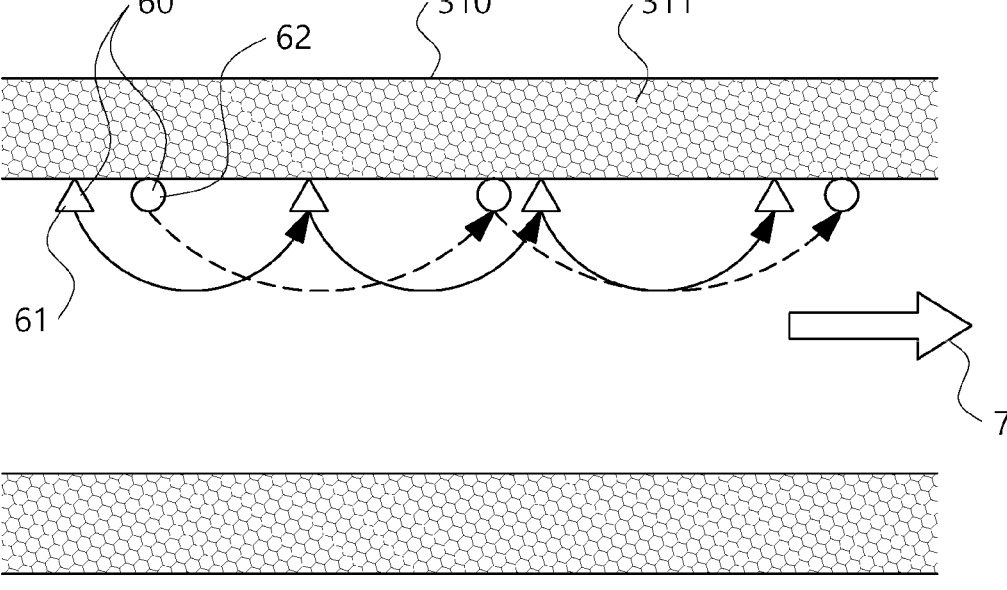
FIG. 9 schematically shows the inside of a separation module in the detection device of FIG. 6.

FIG. 9 schematically shows the inside of the separation path 310 according to an embodiment of the present disclosure.

As shown in FIG. 9, the inner surface of the separation path 310 is coated with a porous material 311 to which the gaseous phase materials 60 may attach. For example, the porous material 311 may be a porous polymer such as PDMS.

The hazardous materials M which are organic compounds attach to the porous polymer by van der Waals forces. In this instance, when the carrier gas 7 flows in the separation path 310, the gaseous phase materials 60 attached to the porous material 311 separate from the porous material 311 and flow a predetermined distance by the force of the carrier gas 7, and then lose the mobility and attach to the porous material 311 again, and this process repeats.

Since the gaseous phase materials 60 differ in mass and van der Waals forces acting between the gaseous phase materials 60 and the porous material 311 depending on the substances, the gaseous phase materials 60 of different substances attach to the porous material 311, separate from the porous material 311 and then flow at different frequencies and distances as shown in FIG. 9. That is, the gaseous phase materials 60 move at different movement speeds in the separation path 310 for each substance. For example, the second material 62 indicated by a circle moves faster than the first material 61 indicated by a triangle.

According to this embodiment, since the separation path 310 has the long path amounting to about 3 m, the movement distance is equalized for each substance while the gaseous phase materials 60 injected through the entry of the separation path 310 are moving along the long path, and the gaseous phase materials 60 come out at the exit of the separation path 310 for each substance. Since the gaseous phase materials 60 have different movement speeds depending on the substances, the gaseous phase materials 60 are separated into substances and come out at the exit of the separation path 310 at time intervals. That is, only by traveling the hazardous materials through the separation path 310 without applying electricity, the gaseous phase materials 60 are separated into substances and discharged at time intervals.

The porous material 311 may be coated on the separation path 310 before the first substrate and the second substrate are bonded to each other, and may be coated by a gas flow method through the inlet pipe (not shown).

The gaseous phase materials 60 leaving the exit of the separation path 310 in a sequential order are detected by the sensor module 400.

The sensor module 400 according to this embodiment is a photoionization detection (PID) sensor that measures a voltage change by electrons released from the gaseous phase materials 60 by applying UV to the gaseous phase materials 60 from the separation path 310 of the separation module 300. Specifically, when a material such as an organic compound is illuminated with UV, a potential occurs due to electron emission.

As the concentration of the corresponding material is higher, the detected potential value is higher, and through this, the concentration of the corresponding material may be calculated.

The sampled gas mixture 6 is pushed by the carrier gas 7 into the concentration chamber 210 through the conduit 52. The gas entering the concentration chamber 210 moves in the long side direction of the concentration chamber 210. In this process, the gaseous phase materials 60 included in the gas mixture 6 are adsorbed onto the adsorbent 212 filled in the concentration chamber 210.

The gaseous phase materials 60 are concentrated in the concentration chamber 210 for the predetermined time, and the concentration chamber 210 is heated by applying the power to the heat line 500. The gaseous phase materials 60 concentrated and stored in the concentration chamber 210 are separated from the adsorbent 212 by the applied thermal energy, and the carrier gas 7 flowing through the concentration chamber 210 carries the gaseous phase materials 60 out of the concentration chamber 210. The carrier gas 7 carrying the gaseous phase materials 60 flows to the separation path 310.

The gaseous phase materials 60 of high concentration from the concentration chamber 210 are instantaneously fed into the separation path 310.

That is, the concentration chamber 210 according to this embodiment acts as not only a reservoir to concentrate and store the hazardous materials, but also an injector to inject the high concentration hazardous materials into the separation path 310.

Figure 10:
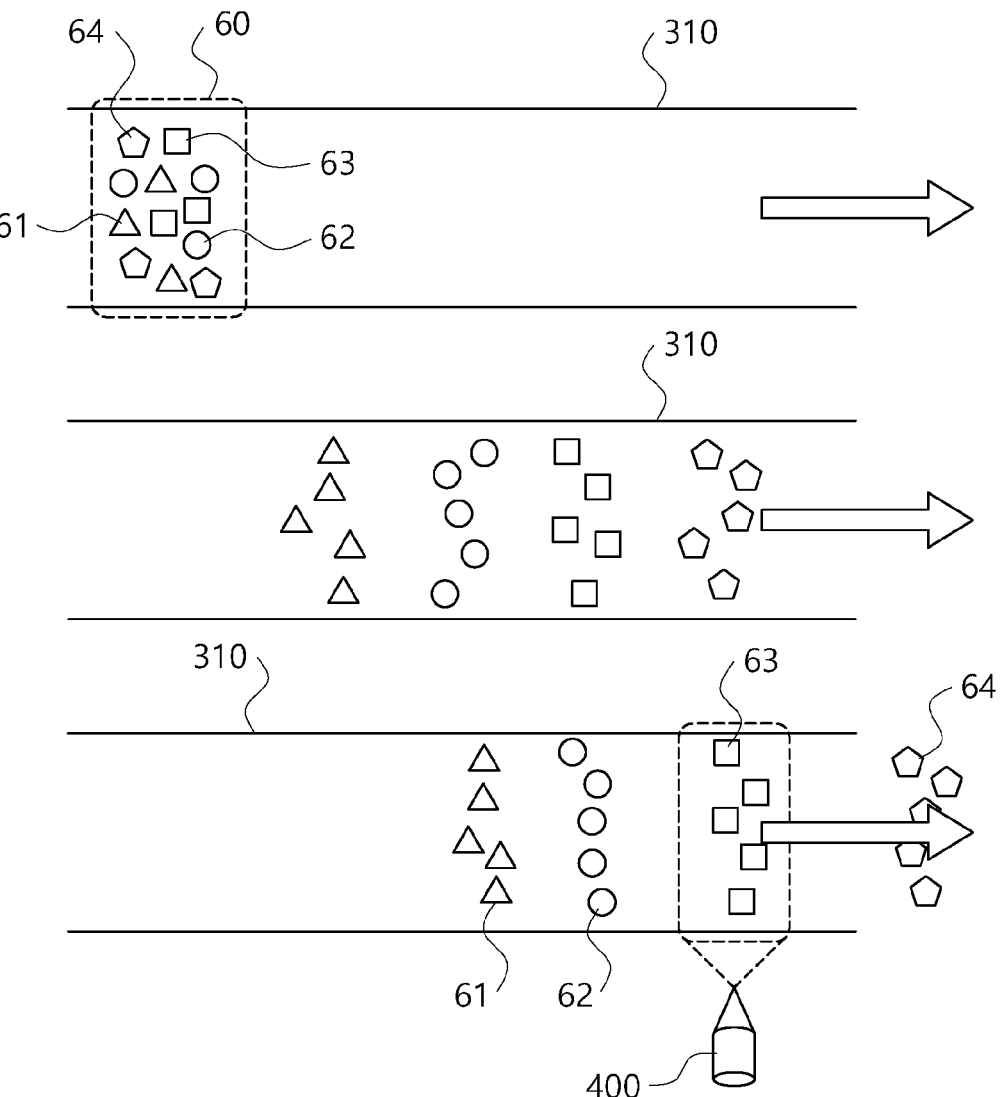
FIG. 10 schematically shows a process of separating and detecting gas phase materials using the detection device of FIG. 6.

FIG. 10 schematically shows the process of separating and detecting the gaseous phase materials 60 using the detection device 120 according to this embodiment.

As described above, the gaseous phase materials 60 have different movement speeds in the separation path 310 depending on the substances.

Through experiments, the time taken by the gaseous phase materials 60 to exit the separation path 310 for each substance may be pre-acquired.

For example, in the case of gas containing isopropylantipyrine (IPA) alone, the corresponding material may be detected by the sensor module 400 in about 20 seconds. In this way, the experiments may be performed on each of the expected gaseous phase materials 60 to generate the libraries of the time taken by each gaseous phase material 60 to exit the separation path 310.

Since the gaseous phase materials 61, 62, 63, 64 of different substances are discharged through the separation path 310 in a sequential order, the substances of the corresponding gaseous phase materials may be identified by identifying the time at which the potential value remarkably rises through the sensor module 20, and the concentration of the corresponding gaseous phase materials may be calculated through the potential value.

Figure 11:
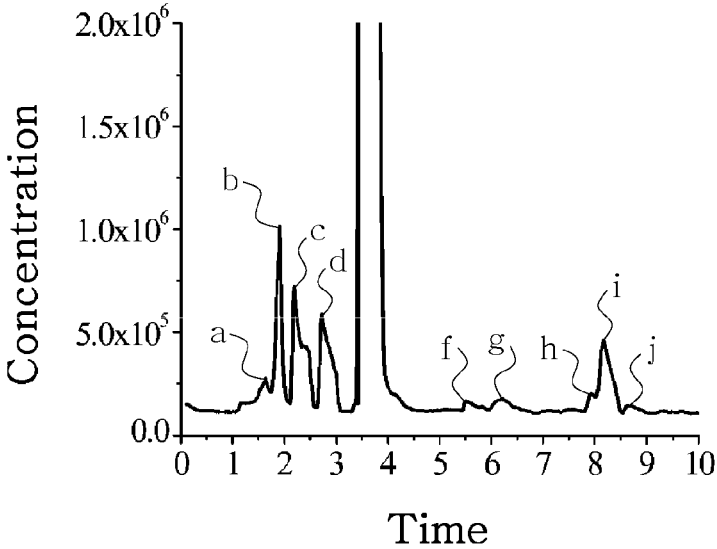
FIG. 11 is a graph showing detection results through a measurement system according to this embodiment.

FIG. 11 is a graph showing the detection results through the measurement system 10 when the plasma cleaning process is performed.

As shown in FIG. 11, it can be seen that a sharp peak or a remarkable rise in potential value appears at the predetermined time.

The substances of the gaseous phase materials detected at the corresponding time are already identified. For example, the material of peak a is pyridine, and the material of peak b is butanediol.

Additionally, the substances and concentration of the gaseous phase materials 60 in the gas mixture 6 from the treatment apparatus 1 may be analyzed through the potential value by the substances of the corresponding gaseous phase materials.

The worker or the control unit of the system may continuously identify the presence or absence of residue on the cleaned wafer 3 by identifying the substances and concentration of the detected gaseous phase materials 60. When the concentration of the specific material is close to 0 or below a predetermined reference value, the worker or the control unit of the system may determine that there is no residue on the cleaned wafer 3 and terminate the cleaning operation.

According to the above-described configuration, it is possible to identify the presence or absence of residue by identifying the presence and concentration of the gaseous phase materials 60 included in the gas mixture 6 from the treatment apparatus 1 while the plasma cleaning process is being performed (in-situ). Accordingly, it is possible to omit the process including stopping the process, testing the wafer using an extra device, and when the test results are below the reference, performing the cleaning process again, thereby significantly improving the yield of the semiconductor component.

Additionally, since the sum of the sampling time and the desorption time and the separation time of the gaseous phase materials 60 from the concentration module is much shorter than the time taken to stop the treatment apparatus 1, transfer the wafer, test and treat again, it is possible to identify the processed state of the wafer substantially "in real time". (Variation)

Figure 12:
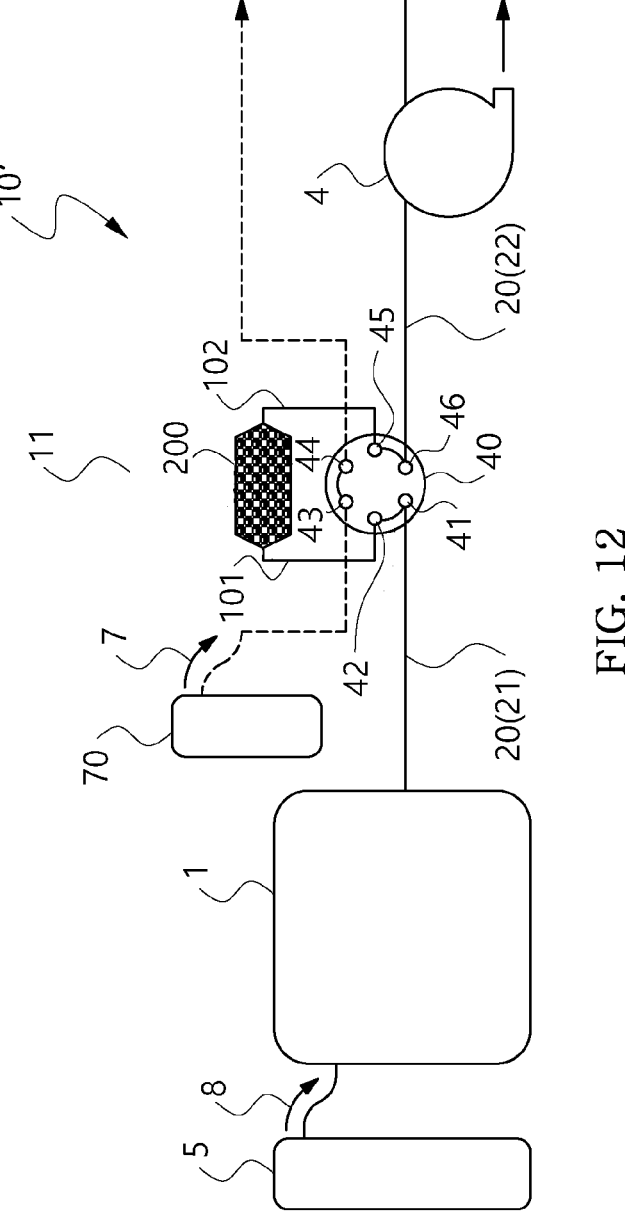
FIG. 12 is a schematic system diagram of a measurement system according to a variation of the present disclosure.

FIG. 12 is a schematic system diagram of the measurement system 10' according to a variation of the present disclosure.

In this variation, when compared with the above-described embodiment, the bypass pipe 30 is not formed, and the exhaust pipe 20 includes an upstream exhaust pipe 21 and a downstream exhaust pipe 22, and the upstream exhaust pipe 21 and the downstream exhaust pipe 32 are selectively connected through the valve 40 interposed therebetween. The upstream exhaust pipe 21 connects to the first port 41 of the valve 40, and the downstream exhaust pipe 22 connects to the sixth port 46 of the valve 40.

Additionally, in this variation, when compared with the above-described embodiment, the concentration module 200 is not disposed in the detection unit, and is disposed in the sampling unit 12. The concentration module 200 is disposed in communication with the sampling unit 11 between the inlet 101 and the outlet 102 of the sampling unit 11.

According to this variation, the inlet 101 and the outlet 102 of the sampling unit 11 selectively communicate the exhaust pipe 20 between the chamber 9 and the pump 4. Accordingly, it is possible to prevent the contamination of the sampled gas mixture 6 by oil from the pump 4. Furthermore, it is possible to easily apply the measurement system 10 to the existing treatment apparatus 1 by replacing the exhaust pipe 20 between the chamber 9 and the pump 4, relatively easy to change the structure, to install the bypass pipe 30.

During the sampling connection operation of the valve 40, the first port 41 and the second port 42 are in communication with each other, and the fifth port 45 and the sixth port 46 are in communication with each other. In this instance, the first port 41 and the sixth port 46 are in non-communication with each other.

Accordingly, the direct communication between the upstream exhaust pipe 21 and the downstream exhaust pipe 22 is shut off, and the upstream exhaust pipe 21 and the inlet 101 of the sampling unit 11 are in communication with each other, and the downstream exhaust pipe 22 and the outlet 102 of the sampling unit 11 are in communication with each other.

That is, during the sampling connection operation of the valve 40, all the paths of the gas mixture 6 pass through the sampling unit 11.

The gas mixture 6 passing through the sampling unit 11 passes through the concentration module 200, and the gaseous phase materials 60 included in the gas mixture 6 are extracted by the concentration module 200 and concentrated in the concentration module 200.

In the above-described embodiment, the sampling unit 11 samples the gas mixture 6 as much as the predetermined volume, while in this variation, the operation of the sampling unit 11 is controlled such that the sampling unit 11 samples the gas mixture 6 for the predetermined time to concentrate a sufficient amount of the gaseous phase materials 60 in the concentration module 200.

After the passage of the predetermined time, by changing the port connection of the valve 40, the sampling shutoff operation is performed to directly communicate the upstream exhaust pipe 21 with the downstream exhaust pipe 22, and discommunicate the exhaust pipe 20 from the sampling unit 11.

Additionally, after the sampling shutoff operation or at the same time with the sampling shutoff operation, the control unit of the valve 40 performs the gas transfer operation to discommunicate the third port 43 from the fourth port 44, communicate the fourth port 44 with the fifth port 45 and the second port 42 with the third port 43.

During the gas transfer operation, when energy such as heat is applied to the concentration module 200, the gaseous phase materials 60 are discharged from the concentration module 200, and the carrier gas 7 carries the gaseous phase materials 60 to the detection unit 12.

The gaseous phase materials 60 are separated into substances and detected while flowing in the separation module (not shown in FIG. 12) and the sensor module (not shown in FIG. 12) in a sequential order.

This variation may be usefully applied when the influence of pressure changes is small since a space for installing the bypass pipe and the sampler module is insufficient or the volume of the sampling unit 11 is similar to the volume of the corresponding exhaust pipe.

Other Embodiments

The above-described embodiment describes that the treatment apparatus 1 is a plasma cleaning apparatus for the wafer, but is not limited thereto. The treatment apparatus 1 may be a UV ozone based cleaning apparatus.

Additionally, the treatment apparatus 1 may be a wafer etching apparatus based on plasma and UV ozone. The etching process may be dry etching or wet etching.

Additionally, the component to be treated may be any other semiconductor component than the wafer, and may not be a semiconductor component. The measurement system 10 according to this embodiment may be applied to any process for producing a gas mixture by reaction between reactive gas and the component in the chamber.

Additionally, according to the above-described embodiment, the detection unit 12 includes the single portable detection device 120, but is not limited thereto. The concentration module 200, the separation module 300 and the sensor module 400 of the detection unit 12 may be respective devices, and each device may not be small enough to carry.

Additionally, according to the above-described embodiment, a PID type sensor is used in the sensor module 400, but a sensor using flame ionization detection (FID) may be used.

Additionally, in the above-described embodiment, the sampler 103 using the spiral conduit is used, but is not limited thereto. The sampler may include, for example, simply a linear conduit shape or a sample bag, to temporarily store the gas mixture 6 as much as the predetermined volume.

Additionally, according to the above-described embodiment, the sampling unit 11 and the detection unit 12 are in fluid communication with each other, but is not limited thereto. After sampling is performed by the sampling unit 11, the sampling unit 11 may be separated, transferred and connected to the detection unit 12 of a different location.

The invention claimed is:

1. A measurement system for measuring a status of a process of a treatment apparatus for treating a component in a chamber to generate a gas mixture including gaseous phase materials, the measurement system comprising:
   a sampling unit configured to selectively fluidically communicate with an exhaust pipe for discharging the gas mixture including the gaseous phase materials from the chamber to sample a predetermined volume of the gas mixture or to sample the gas mixture from the exhaust pipe for a predetermined time; and
   a detection unit configured to separate and detect the gaseous phase materials included in the gas mixture sampled by the sampling unit into substances;
   wherein the exhaust pipe connects to a bypass pipe branching off from the exhaust pipe at a first branch point and reconnects to the exhaust pipe at a second branch point, and
   wherein the sampling unit is configured to selectively fluidically communicate with the bypass pipe and to selectively fluidically communicates the exhaust pipe.

2. The measurement system according to claim 1, wherein the bypass pipe includes an upstream bypass pipe and a downstream bypass pipe connected through a multi-port valve, and
   wherein the multi-port valve is configured to:

perform a sampling connection operation to shut off fluid communication between the upstream bypass pipe and the downstream bypass pipe, and to communicate the upstream bypass pipe with an inlet of the sampling unit and the downstream bypass pipe with an outlet of the sampling unit, and
   perform a sampling shutoff operation enabling the upstream bypass pipe to fluidically communicate with the downstream bypass pipe, and to enable the bypass pipe to fluidically disconnect from the sampling unit.

3. The measurement system according to claim 2, wherein the multi-port valve is configured to perform a gas transfer operation to communicate the outlet of the sampling unit with the detection unit after the sampling shutoff operation or at a same time with the sampling shutoff operation.

4. The measurement system according to claim 3, wherein during the gas transfer operation, the multi-port valve is configured to:
   communicate the sampling unit with a carrier gas tank, and
   allow the gas mixture to flow to the detection unit by a carrier gas from the carrier gas tank.

5. The measurement system according to claim 4, wherein the multi-port valve is configured to communicate the carrier gas tank with the detection unit, apart from the gas transfer operation.

6. The measurement system according to claim 2, wherein a portion of a front end of the upstream bypass pipe is inserted into the exhaust pipe to guide some of the gas mixture flowing in the exhaust pipe into the upstream bypass pipe.

7. The measurement system according to claim 1, wherein the sampling unit includes a sampler module configured to store the predetermined volume of the gas mixture.

8. The measurement system according to claim 1, wherein the detection unit includes:
   a separation module to separate the gaseous phase materials included in the gas mixture into substances, wherein the separation module includes a separation path in which the gaseous phase materials move at different movement speeds according to substances, to separate the gaseous phase materials into substances and discharge at time intervals, and
   a sensor module to detect the gaseous phase materials from the separation module, wherein the sensor module is configured to measure a time and concentration at which the gaseous phase materials from the separation path are detected.

9. The measurement system according to claim 8, wherein the separation path has a shape of a column bent in a maze pattern within a set space.

10. The measurement system according to claim 9, wherein a porous material is coated on an inner surface of the separation path, and
   wherein the gaseous phase materials repeatedly attach to and separate from the porous material while flowing along the separation path.

11. The measurement system according to claim 1, wherein the detection unit includes:
   a separation module to separate the gaseous phase materials included in the gas mixture into substances; and
   a sensor module to detect the gaseous phase materials from the separation module,
   wherein the sensor module is configured to detect a concentration of the gaseous phase materials by measuring a voltage change by electrons released from the gaseous phase materials by applying UV to the gaseous phase materials from the separation module.

12. The measurement system according to claim 1, wherein the measurement system comprises a concentration module to extract the gaseous phase materials included in the gas mixture sampled by the sampling unit and concentrate and store the gaseous phase materials.

13. The measurement system according to claim 12, wherein the concentration module is disposed in one of the sampling unit and the detection unit.

14. The measurement system according to claim 12, wherein the concentration module includes:

a concentration chamber; and an adsorbent to trap the gaseous phase materials filled in the concentration chamber.

15. The measurement system according to claim 14, wherein the concentration chamber has a plurality of pillars to support the adsorbent.

16. The measurement system according to claim 12, wherein the detection unit is portable.

17. The measurement system according to claim 1, wherein the exhaust pipe is connected to a pump to form a pressure for discharging the gas mixture from the chamber, and wherein the bypass pipe has an entry and an exit connected to the exhaust pipe between the chamber and the pump.

18. A system comprising the measurement system according to claim 1 and the treatment apparatus, wherein the treatment apparatus is a semiconductor treatment apparatus for etching or cleaning the component, wherein the component is a semiconductor component.

19. A measurement system for measuring a status of a process of a treatment apparatus for treating a component in a chamber to generate a gas mixture including gaseous phase materials, the measurement system comprising:

a sampling unit configured to selectively fluidically communicate with an exhaust pipe for discharging the gas mixture including the gaseous phase materials from the chamber to sample a predetermined volume of the gas mixture or to sample the gas mixture from the exhaust pipe for a predetermined time; and a detection unit configured to separate and detect the gaseous phase materials included in the gas mixture sampled by the sampling unit into substances;

wherein the exhaust pipe includes an upstream exhaust pipe and a downstream exhaust pipe connected through a multi-port valve, and wherein the multi-port valve is configured to:

perform a sampling connection operation to shut off fluid communication between the upstream exhaust pipe and the downstream exhaust pipe, and to communicate the upstream exhaust pipe with an inlet of the sampling unit and the downstream exhaust pipe with an outlet of the sampling unit, and perform a sampling shutoff operation enabling the upstream exhaust pipe to fluidically communicate with the downstream exhaust pipe, and to enable the exhaust pipe to fluidically disconnect from the sampling unit.

20. The measurement system according to claim 19, wherein the measurement system comprises a concentration module to extract the gaseous phase materials included in the gas mixture sampled by the sampling unit and concentrate and store the gaseous phase materials.

21. The measurement system according to claim 19, wherein the detection unit includes:

a separation module to separate the gaseous phase materials included in the gas mixture into substances, wherein the sensor module is configured to detect a concentration of the gaseous phase materials by measuring a voltage change by electrons released from the gaseous phase materials by applying UV to the gaseous phase materials from the separation module.

22. A measurement system for measuring a status of a process of a treatment apparatus for treating a component in a chamber to generate a gas mixture including gaseous phase materials, the measurement system comprising:

a sampling unit configured to selectively fluidically communicate with an exhaust pipe for discharging the gas mixture including the gaseous phase materials from the chamber to sample a predetermined volume of the gas mixture or to sample the gas mixture from the exhaust pipe for a predetermined time; and a detection unit configured to separate and detect the gaseous phase materials included in the gas mixture sampled by the sampling unit into substances;

wherein the exhaust pipe is connected to a pump to form a pressure for discharging the gas mixture from the chamber, and wherein an inlet and an outlet of the sampling unit selectively fluidically communicate with the exhaust pipe between the chamber and the pump.

\* \* \* \* \*